E. TAYLOR.
COVERING ATTACHMENT FOR SEED PLANTERS.
APPLICATION FILED DEC. 20, 1915.
1,197,076. Patented Sept. 5, 1916.
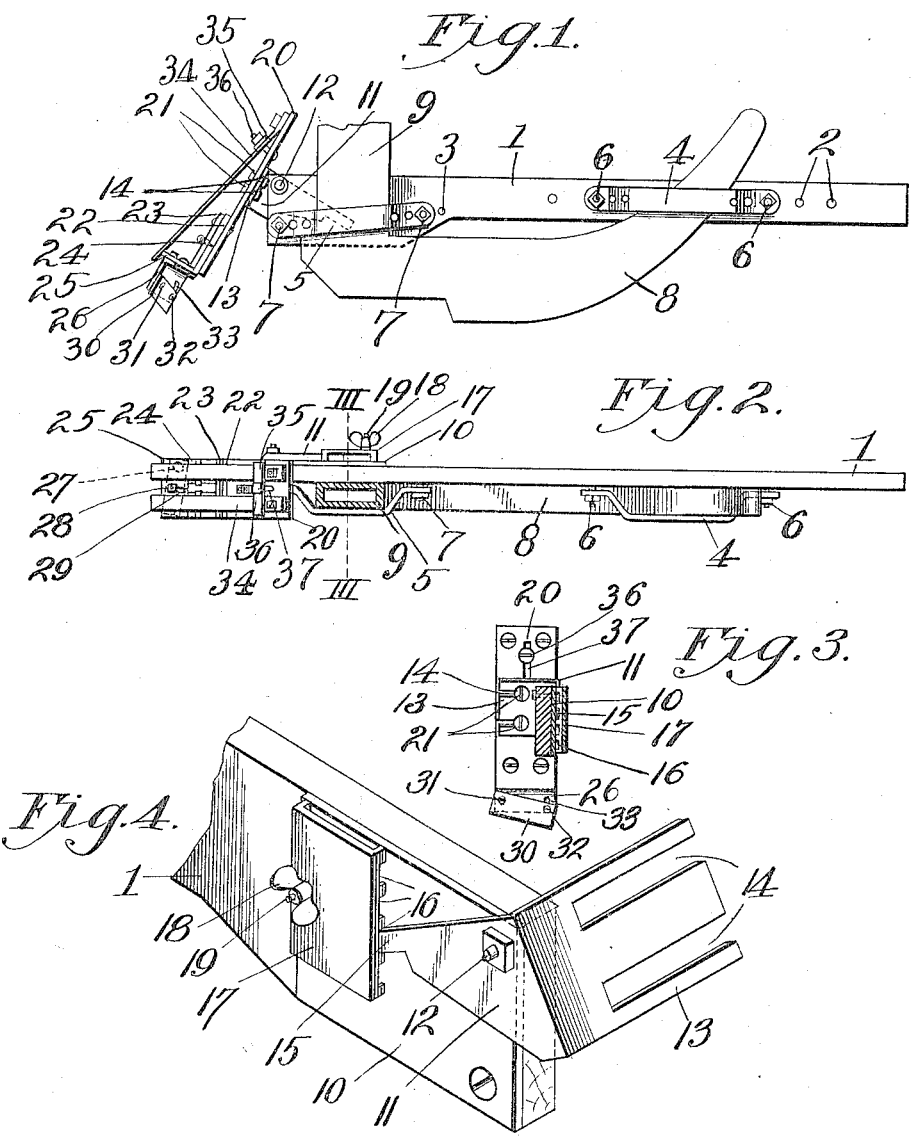
Witness
M. C. Bohn
Inventor
Edwin Taylor
By George H. Thorpe
Attorney

UNITED STATES PATENT OFFICE.

EDWIN TAYLOR, OF EDWARDSVILLE, KANSAS.

COVERING ATTACHMENT FOR SEED-PLANTERS.

1,197,076. Specification of Letters Patent. Patented Sept. 5, 1916.

Application filed December 20, 1915. Serial No. 67,766.

*To all whom it may concern:*

Be it known that I, EDWIN TAYLOR, a citizen of the United States, residing at Edwardsville, in the county of Wyandotte and State of Kansas, have invented certain new and useful Improvements in Covering Attachments for Seed-Planters, of which the following is a specification.

This invention relates to covering attachments for seed planters and has for its object to produce a device susceptible of quick and easy attachment to or detachment from any of the standard types of seed planters, and which has the dual functions of equalizing the depth at which the machine shall cover the seed grain which it drops and of compressing the soil upon such seed.

Another object is to produce an attachment by which a drainage channel can be formed at one side of and parallel with the line of planted seed and which will serve to clear the seed line of trash.

Specifically the invention consists of a drag plate carried by a yielding bar and adjustable as to depth, pitch, angle, and ground penetrating or bite effect and also adjustable laterally for disposition with regard to the line of travel of the seed dropping device.

With the objects named in view, and others as will hereinafter appear, the invention consists in certain novel and peculiar features of construction and organization as hereinafter described and claimed, and in order that it may be fully understood reference is to be had to the accompanying drawing, in which—

Figure 1, is a side elevation of a fragment of a grain planter, equipped with a seed covering attachment embodying my invention. Fig. 2, is a plan view of the construction shown by Fig. 1. Fig. 3, is a vertical section on the line III—III of Fig. 2, but with the runner and flexible clamping strap omitted. Fig. 4, is an enlarged perspective view of part of the device.

In the said drawing, a holding frame consists of a bar or wood slat 1 provided with front and rear sets of bolt holes 2 and 3 respectively, and front and rear flexible clamping straps 4 and 5 adapted to be secured to the bar by fastening devices such as bolts and nuts 6 and 7, the straps being adjustable by fitting the bolts through different holes 2 and 3, to accommodate the parts to which the holding frame is to be secured. The straps are also provided with extra bolt holes as shown so that they may be caused to properly engage parts of varying sizes.

As shown the holding frame is applied to a grain planter, 8 indicating a runner thereof and 9 one of the seed legs, the detailed construction of said parts not being shown. It will be seen by reference to Fig. 2 that when the nuts are screwed home on the bolts, the flexible straps bend around the juxtaposed parts of the runner and seed leg and thus clamp the bar firmly to said parts. It will be apparent of course that the flexible clamping straps provide for a two-point attachment to the framework of a planter or drill and to the seed pipe of a wheat drill, or as a double clamp on the draw bar alone, it being understood that by the use of a bar and two flexible clamps, the holding device constitutes practically a universal attachment.

If the bar 1 is of wood, it is preferably shod at one side with a metal plate 10. A right angle bracket 11 is fitted with one arm flatly against plate 10 and pivoted thereto and to the bar 1 as at 12, for movement in a vertical plane. The other arm 13 of the bracket extends transversely rearward of the bar 1 and is provided with a pair of horizontal slots 14, for a purpose which hereinafter appears.

The pivoted arm of the bracket is reduced to form an extension 15 adapted for engagement with any one of a vertical series of notches 16 in a flanged retainer plate 17 fitted against the outer side of plate 10 and clamped thereto by means of a wing nut 18 engaging a bolt 19 extending outward from the plate 10 through the retainer plate 17. When it is desired to pivotally adjust the angle bracket the nut 18 is unscrewed sufficiently to permit the plate 17 to be moved outward enough to permit of pivotal action of the bracket and when the latter is adjusted as desired, it is secured in position by reversing the movement of the retainer plate and the operation of the wing nut. By vertical adjustment of the angle bracket, a variation in the depth at which the seed planter covers the seed grain is effected and a variation in the compression of the soil upon the seed is accomplished, as will hereinafter appear.

A plate 20 fits flatly against arm 13 of the angle bracket and is securely fastened to said arm by bolts 21 which engage slots 14 so that the plate 20 can be laterally adjusted with respect to the center of the seed dropping or guiding devices in front of it. Fastened to the outer side of the plate 20 near the lower end thereof is a filler block 22 to which is rigidly secured the upper member 23 of a hinge, the lower member 24 of the hinge being secured to the upwardly projecting arm of an angle bracket 25, the said upwardly projecting arm bearing against the plate 20 under normal conditions of service.

Underlying and inverted with respect to the hinged bracket 25, is an angle bracket 26, and said bracket is pivoted at one end at 27 so that it can be adjusted to change the angle to the line of draft, fastening devices such as a bolt 28 extending through said angle bracket or plate 26 and through a slot 29 in the hinged angle bracket 25 for the purpose of securing bracket 26 at the desired point of adjustment.

30 is a drag plate fitting against the depending arm of angle bracket 26 and pivoted thereto at 31 and provided with fastening devices 32 which coöperatively engage with the slot 33 formed in bracket 26 around pivotal point 31 as an axis, so that the bracket can be pivotally adjusted so that it shall act merely as a drag without material ground penetration or produce a channel in the ground at one side of and parallel with the line of seed dropped from the planter.

When the drag is adjusted to produce a channel as indicated in Figs. 1 and 3, it will of course incidentally push soil over the seed in the furrow produced by the runner and compress such soil by reason of the fact that it bears a downwardly and rearwardly pitched relation to the surface of the ground, which pitched relation can of course be increased or diminished by adjustment of the angle bracket 11.

To hold the hinged bracket and hence the drag in yieldingly depressed position, a pair of springs 34 bear near their lower ends upon said bracket and at their upper ends are bolted to plate 20, and to uniformly vary the tension of these springs, a cross bar 35 fits against both springs and is connected by fastening devices 36, such as a bolt and nut to plate 20, the bolt being adjustable upward and downward in a slot 37 in said plate as shown most clearly in Fig. 3.

If it is desired simply to cover the seed at a uniform depth, the drag plate is adjusted to a horizontal position and the bracket 11 is adjusted to dispose the plate 20 substantially vertical if it is not desired to compress the soil upon the seed. If it is desired to compress the soil upon the seed the bracket 11 is adjusted to dispose the plate 20 downwardly and rearwardly at the desired angle, and said plate is adjusted longitudinally upon said bracket to dispose the drag plate in the desired horizontal plane. When the adjustments mentioned are made, the drag plate will cover the seed to uniform depth, removing soil where there is an excess and spreading it where there is a lack of soil, that is to say the drag plate will level the high places and fill up the low places.

If there is more or less trash in the field, it will be desirable to increase the angle of the drag plate to the line of draft so that trash will be pushed to one side of the line where the seed is planted, and if it is desired to conserve moisture and at the same time protect the planted seed from being washed out, the drag plate can be pivotally adjusted to substantially the position shown in Figs. 1 and 3 so that one of its corners shall act to dig a shallow channel in the soil near and parallel to the line of planted seed. This channel will provide a means for carrying off excess water and at the same time retain sufficient water to provide proper moisture for the plants.

In the event the drag plate encounters an unyielding surface or obstruction, the springs will yield to permit the spring plate to swing upward to permit the drag plate to pass over the obstruction without injury, the reaction of the springs after the obstruction is passed returning the hinged bracket and parts carried thereby to operative position.

From the above description it will be apparent that I have produced a covering attachment for seed planters and I wish it to be understood that while I have illustrated and described the preferred embodiment of the same, I reserve the right to make all changes falling within the spirit and scope of the appended claims.

I claim:—

1. A covering attachment for seed planters comprising a holding frame for securement to a part of a seed planter, a bracket secured to the holding frame, a plate secured to the bracket, a bracket hingedly connected to the first-named plate, a drag plate depending from said hinged plate and pivotally supported therefrom for adjustment thereon to alter the angle of the drag plate to the line of draft, and yielding means for holding the drag plate in operative position.

2. A covering attachment for seed planters comprising a holding frame for securement to a part of a seed planter, a bracket secured to the holding frame, a plate secured to the bracket, a bracket hingedly connected to the first-named plate, a bracket depending and pivoted to said hinged plate so that the bracket may be disposed at different angles to the line of draft, a drag plate adjustable thereon to occupy a position parallel with the level of the ground or pitched with respect to the same, and yielding means for holding the drag plate in operative position.

3. A covering attachment for seed planters comprising a holding frame for securement to a part of a seed planter, a bracket secured to the holding frame, a plate secured to the bracket, a bracket hingedly connected to the first-named plate, a bracket depending from and pivoted to said hinged plate so that the bracket may be disposed at different angles to the line of draft, a drag plate pivotally mounted on the said depending bracket and adjustable thereon to occupy a position parallel with the level of the ground or pitched with respect to the same, and yielding means for holding the drag plate in operative position.

4. A covering attachment for seed planters comprising a holding frame for securement to a part of a seed planter, an angle bracket pivoted for movement in a vertical plane to the said frame, means for securing the bracket at different points of adjustment, a plate carried by the angle bracket, a drag plate hingedly supported by and depending from said last-named plate and yielding means for holding the drag plate in operative position.

5. A covering attachment for seed planters comprising a holding frame for securement to a part of a seed planter, an angle bracket pivoted for movement in a vertical plane to the said frame, means for securing the bracket at different points of adjustment, a plate adjustable up and down upon the angle bracket, a bracket hinged to the said plate for movement in a vertical plane, a second bracket depending from the hinged bracket and adjustable to extend transversely or at an angle to the line of draft, a drag plate mounted on the depending bracket and pivotally adjustable up and down thereon, and yielding means for holding the hinged bracket in operative position.

In testimony whereof I affix my signature in the presence of two witnesses.

EDWIN TAYLOR.

Witnesses:
 H. C. RODGERS,
 G. Y. THORPE.

Copies of this patent may be obtained for five cents each, by addressing the "Commissioner of Patents, Washington, D. C."